US008997807B2

(12) United States Patent
Misani et al.

(10) Patent No.: US 8,997,807 B2
(45) Date of Patent: Apr. 7, 2015

(54) TYRE FOR MOTOR VEHICLES

(75) Inventors: Pierangelo Misani, Milan (IT); Mario Mariani, Milan (IT); Andrea Schiavolin, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 906 days.

(21) Appl. No.: 13/141,955

(22) PCT Filed: Dec. 24, 2008

(86) PCT No.: PCT/IT2008/000799
§ 371 (c)(1),
(2), (4) Date: Jun. 23, 2011

(87) PCT Pub. No.: WO2010/073279
PCT Pub. Date: Jul. 1, 2010

(65) Prior Publication Data
US 2011/0253276 A1  Oct. 20, 2011

(51) Int. Cl.
*B60C 11/117* (2006.01)
*B60C 11/03* (2006.01)

(52) U.S. Cl.
CPC ......... *B60C 11/0302* (2013.01); *B60C 2200/10* (2013.01); *B60C 2011/0383* (2013.01); *B60C 2011/0374* (2013.01)

(58) Field of Classification Search
CPC  B60C 11/03; B60C 11/0302; B60C 11/0304; B60C 11/032; B60C 2200/10; B60C 2200/12; B60C 2200/14; B60C 2011/0358; B60C 2011/0372; B60C 2011/0374; B60C 2011/0381; B60C 2011/0383; B60C 11/13
USPC ............... 152/209.28, 209.11, 209.18, 209.8, 152/903, 904, 209.1, 209.16, 209.17; D12/535, 570
See application file for complete search history.

(56) References Cited

U.S. PATENT DOCUMENTS 5,105,864 A  4/1992  Watanabe et al.
6,276,415 B1  8/2001  Nakamura
(Continued)

FOREIGN PATENT DOCUMENTS

CN  1802268 A  7/2006
EP  0 906 836 A2  4/1999
(Continued)

OTHER PUBLICATIONS

First Office Action issued Feb. 7, 2013, in Chinese Application No. 200880132487.1.
(Continued)

*Primary Examiner* — Eric Hug
(74) *Attorney, Agent, or Firm* — Finnegan, Henderson, Farabow, Garrett & Dunner, L.L.P.

(57) ABSTRACT

A tyre for motor vehicles, in particular for rear wheels of motor vehicles, has a tread band including an annular central portion, two first annular side portions and two second annular side portions, each arranged between the annular central portion and a respective first annular side portion and being narrower than the first annular side portion. The tread band has at least one module replicated along a circumferential direction of the tyre and includes grooves inclined with respect to the equatorial plane, at least two first grooves, each extending from a second annular side portion to a first annular side portion; at least two second grooves spaced from the first grooves in the circumferential direction, each extending only on a respective second annular side portion and at least two third grooves arranged along the circumferential direction on the opposite side to the first grooves with respect to the second grooves, each of said third grooves extending from a second annular side portion to a first annular side portion.

21 Claims, 2 Drawing Sheets

(56) References Cited

U.S. PATENT DOCUMENTS

| | | | |
|---|---|---|---|
| D490,359 S * | 5/2004 | Isaka | D12/535 |
| D553,073 S * | 10/2007 | Kajimoto | D12/535 |
| D599,729 S * | 9/2009 | Kumamoto | D12/535 |
| 2006/0219342 A1 | 10/2006 | Steinbach | |
| 2009/0078349 A1 | 3/2009 | Nakagawa | |

FOREIGN PATENT DOCUMENTS

| | | |
|---|---|---|
| EP | 0 928 707 A2 | 7/1999 |
| EP | 1 884 377 A1 | 2/2008 |
| JP | 63-121505 | 5/1988 |
| JP | 03-044002 | 4/1991 |
| JP | 10-297218 A | 11/1998 |
| JP | 2001-071711 A | 3/2001 |
| JP | 2004-155335 | 6/2004 |
| JP | 2006-321287 A | 11/2006 |
| JP | 2007-506590 | 3/2007 |
| JP | 2007-331596 | 12/2007 |
| JP | 2008-296707 | 12/2008 |
| WO | WO 2005/005169 A1 | 1/2005 |
| WO | WO 2008/124899 A | 10/2008 |
| WO | WO 2010/073280 A1 | 7/2010 |

OTHER PUBLICATIONS

International Search Report from the European Patent Office in International Application No. PCT/IT2008/000799 mailed Sep. 11, 2009.
International Search Report from the European Patent Office in International Application No. PCT/IT2008/000800 mailed Aug. 19, 2009.
Notice of Reasons for Rejection issued by Japanese Patent Office on Dec. 17, 2013 in corresponding Application No. JP 2011-542977 (3 pages).
English-language translation of Notice of Reasons for Rejection issued by Japanese Patent Office on Dec. 17, 2013 in corresponding Application No. JP 2011-542977 (3 pages).

* cited by examiner

TYRE FOR MOTOR VEHICLES

CROSS REFERENCE TO RELATED APPLICATION

This application is a national phase application based on PCT/IT2008/000799, filed Dec. 24, 2008, the content of which is incorporated herein by reference.

BACKGROUND OF THE INVENTION

1. Field of the Invention

The present invention relates to a tyre for motor vehicles, i.e. a tyre having a high transversal curvature so as to offer an adequate contact surface with the road surface when the motor vehicle is leaning to turn a bend.

2. Description of the Related Art

Preferably, the tyre of the present invention is intended to be used in a rear wheel of motor vehicles of the "Sport Touring" type, i.e. sports motor vehicles intended to offer high performance in terms of power, comfort and mileage on motorways and streets, in cities and/or outside cities and/or off-road, with a wet or dry road surface.

"Sport Touring" motor vehicles typically have a large piston displacement (equal to or greater than 800 $cm^3$) and/or high power (equal to or greater than 110 HP). However, on the market there are already motor vehicles having a piston displacement equal to 1400 $cm^3$ and power equal to 155 HP.

It is known that the tyres for rear wheels of such motor vehicles must ensure a high versatility of use both when driving in a straight line and cornering, always ensuring high traction and grip on the road surface in order to allow an optimal transfer of power and an adequate braking action, also with a load of two people and on any type of road surface (wet, dry, regular and/or irregular asphalt, etc.) and/or route (city streets, motorways, mountain roads with a large number of bends, etc.).

Such tyres must also ensure comfort, driving stability, controllability, directionality, road-holding, high mileage and regular wear.

It is known how the behaviour of the tyre during travel is greatly influenced by the number, orientation, distribution and shape of the grooves formed on the tread band, and thus by the particular pattern of such a tread band.

The aforementioned grooves for example promote the grip of the tyre on the road surface and the draining of water in the case of a wet road surface. However, such grooves weaken the structure of the tread band, making it more subject to wear. They can also generate noise and vibrations.

EP 0 906 836 describes a tyre for a motor vehicle the tread band of which comprises a central region astride of an equatorial plane of the tyre, two shoulder regions arranged on axially opposite sides with respect to the central region and two intermediate regions each arranged between the central region and a respective shoulder region. A plurality of grooves are formed in the tread band that extend from opposite sides with respect to the equatorial plane up to the axially outermost portion of the shoulder region and according to a direction that in the central region is substantially circumferential, in the shoulder regions is substantially transversal and in the intermediate regions changes progressively from substantially circumferential to substantially transversal going from the equatorial plane outwards. The grooves formed on one side of the tyre with respect to the equatorial plane thereof are staggered along the circumferential direction with respect to the corresponding grooves formed on the other side of the tyre.

EP 1 884 377 describes a tyre for motor vehicle the tread band of which comprises two groups of curvilinear grooves inclined with respect to the equatorial plane of the tyre, such groups alternating in the circumferential direction and being arranged on both sides of the tyre with respect to the equatorial plane thereof, so as to mirror and be staggered from each other in the circumferential direction. Each group of grooves comprises two or more grooves that are substantially parallel to one another and inclined by an angle of between 5° and 85° with respect to the circumferential direction. All of the grooves extend up to the shoulder regions of the tread band.

SUMMARY OF THE INVENTION

The Applicant has studied a new tread band pattern for a tyre for motor vehicles, particularly for rear wheels of motor vehicles of the "Sport Touring" type.

In this matter, the Applicant has noted how it is particularly difficult to obtain all of the aforementioned preferred characteristics in such a tyre since such characteristics in part contrast one another.

For example, the Applicant has found that in practice the search for optimal performance of the tyre in terms of traction and acceleration contrasts the need to obtain optimal performance of the tyre in terms of mileage and noise/vibrations. At the same time, the Applicant has observed that the search for optimal performance of the tyre on the street to some extent contrasts the need to obtain optimal performance of the tyre in terms of traction, controllability and directionality on slippery, sandy and/or muddy ground.

The Applicant has however observed that, in a tyre intended to be used in the rear wheels of motor vehicles of the "Sport Touring" type, the central area of the tread band can be mainly intended to provide traction and acceleration on all types of road surface and to ensure water drainage on wet road surfaces above all when the motor vehicle is slightly leaning to turn a bend with a high bending radius; the shoulder areas, on the other hand, can be mainly intended to offer lateral stability, grip and controllability, above all during acceleration coming out from the tightest bends and during braking on road routes.

The Applicant has thus provided a special pattern of the tread band having a module replicated along a circumferential direction of the tyre and comprising grooves inclined with respect to the equatorial plane of the tyre. Some of such grooves extend from a central area of the tyre up to the opposite axially outer annular portions, so as to allow water to drain and to give the central area of the tyre the necessary mobility to achieve the desired performance of the tyre in terms of traction and acceleration. Other grooves, on the other hand, do not extend over the aforementioned axially outer portions, so as to give the shoulder areas of the tyre the necessary stiffness and thus be able to achieve the desired performance of the tyre in terms of lateral stability, grip and controllability during acceleration coming out from a bend and when braking on road routes.

The present invention relates to a tyre for motor vehicles having a tread band comprising an annular central portion astride of an equatorial plane of the tyre, two first annular side portions arranged on axially opposite sides with respect to the annular central portion and two second annular side portions each arranged between the annular central portion and a respective first annular side portion, the tread band having at least one module replicated along a circumferential direction of the tyre and comprising:

at least two first grooves inclined with respect to the equatorial plane and each extending on a respective second annular side portion up to reaching a respective first annular side portion;

at least two second grooves inclined with respect to the equatorial plane and spaced from said at least two first grooves in the circumferential direction, each of said at least two second grooves extending only on a respective second annular side portion and up to an axially outer portion of said second annular side portion;

at least two third grooves inclined with respect to the equatorial plane and arranged, along the circumferential direction, on the opposite side to said at least two first grooves with respect to said at least two second grooves, each of said at least two third grooves extending on a respective second annular side portion and on a respective first annular side portion; the extension on the second annular side portion being shorter than the extension on the first annular side portion.

Throughout the present description and in the subsequent claims, the terms "axial" and/or "axially" are used to indicate a direction substantially perpendicular to the equatorial plane of the tyre, i.e. a direction substantially parallel to the rotation axis of the tyre. The terms "circumferential" and/or "circumferentially", on the other hand, are used to indicate a direction substantially parallel to the equatorial plane of the tyre along the circumferential extension of the tyre itself.

Moreover, throughout the present description and in the subsequent claims, the term "module" is used to indicate a portion of tread pattern which is repeated identically in succession along the entire circumferential extension of the tread band itself. The modules, whilst keeping the same pattern configuration, can nevertheless have different circumferential lengths.

In the tyre of the present invention, the aforementioned annular central portion and the aforementioned opposite second annular side portions form a central area of the tyre intended to come into contact with the road surface when the motor vehicle travels in a straight line or slightly leaning, for example with camber angles smaller than 30°. Differently, the aforementioned first side portions are mainly defined in respective shoulder areas of the tyre intended to come into contact with the road surface when the motor vehicle turns a bend leaning to a greater extent, for example with camber angles greater than 30°.

The Applicant has advantageously observed that a tread pattern of the type described above is particularly suitable for a tyre intended for be used in rear wheels of motor vehicles of the "Sport Touring" type, since it ensures high versatility of use of the tyre both when travelling in a straight line and cornering, always ensuring high traction and grip on all types of surface and/or route, at the same time offering the desired performance in terms of comfort, driving stability, controllability, directionality, road-holding, high mileage and regular wear.

In particular, the special pattern of the tread band of the tyre of the present invention at the central area thereof allows this area to be given the necessary mobility to achieve the desired performance of the tyre in terms of traction and acceleration and of comfort when the motor vehicle travels in a straight line or slightly leaning. At the same time, the special pattern at the opposite shoulder areas of the tyre of the present invention allows these areas to be given the necessary stiffness to achieve the desired performance of the tyre in terms of lateral stability, grip and controllability when the motor vehicle turns bends leaning to a greater extent. Moreover, the inclination of all of the grooves with respect to the equatorial plane of the tyre allows effective water drainage in wet road conditions. Such drainage is also made effective by the fact that the first and third grooves extend up to the opposite shoulder areas of the tyre.

Advantageously, the tyre of the present invention has a solid/empty ratio that, at the central area thereof intended to come into contact with the road surface when travelling in a straight line or slightly leaning, is greater than that at the opposite shoulder areas thereof intended to come into contact with the road surface when cornering. Thus, the desired structural mobility is ensured in the central area of the tyre and the desired structural rigidity is ensured in the shoulder areas of the tyre.

The present invention can, in the preferred aspects thereof, have one or more of the following preferred characteristics.

In preferred embodiments of the tyre of the present invention, said at least two first grooves, said at least two second grooves and said at least two third grooves respectively extend symmetrically from axially opposite sides with respect to the equatorial plane of the tyre. Such symmetry, as well as giving the tyre of the present invention a special appearance, ensures uniformity of behaviour in any cornering direction.

Preferably, each of said at least two second grooves extends over the entire respective second annular side portion. In this way the mobility of the tyre is increased at the areas of the tyre close to the equatorial plane, contributing to increasing the driving comfort when travelling in a straight line or slightly leaning.

Preferably, each of said at least two third grooves extends on the respective second annular side portion for a portion having an axial length no greater than 20% of the overall axial length of said groove.

Such a characteristic contributes to increasing the mobility of the tyre at the areas of the tyre intended to come into contact with the road surface when travelling in a straight line or slightly leaning.

In particularly preferred embodiments of the tyre of the present invention, each of said at least two first grooves extends from the respective second annular side portion up to an axially outer portion of the respective first annular side portion. In this way optimal water drainage is obtained on wet road surfaces.

Preferably, each of said at least two third grooves extends from the respective second annular side portion up to an axially outer portion of the respective first annular side portion. In this way a further improvement in water drainage is obtained on wet road surfaces.

In the preferred embodiments of the tyre of the present invention, said at least two second grooves have an extension, in the circumferential direction, shorter than that of said at least two first grooves and said at least two third grooves. This advantageously contributes to obtaining a higher solid/empty ratio at the central area of the tyre intended to come into contact with the road surface, when travelling in a straight line or slightly leaning and less at the shoulder areas of the tyre intended to come into contact with the road surface when the motor vehicle turns leaning to a greater extent.

Preferably, said at least two third grooves have an extension in the circumferential direction shorter than that of said at least two first grooves.

More preferably, the extension in the circumferential direction of each of said at least two second grooves is shorter than half the extension in the circumferential direction of each of said at least two third grooves.

In the preferred embodiments of the tyre of the present invention, each of said at least two first grooves extends along a broken line comprising at least two rectilinear portions that are differently inclined with respect to the equatorial plane of the tyre. Preferably, said broken line comprises three rectilinear portions.

More preferably, a first portion of the aforementioned broken line has a first inclination with respect to the equatorial plane of the tyre, a second axially outermost portion with respect to the first portion has an inclination greater than that of the first portion, and a third axially outermost portion with respect to the second portion has an inclination greater than that of the second portion. The Applicant has noted that such geometry allows optimal water drainage.

Preferably, the axially outermost portion of the aforementioned broken line is, at a free end portion thereof, substantially triangle shaped.

In the preferred embodiments of the tyre of the present invention, each of said at least two third grooves extends along a broken line comprising at least two rectilinear portions differently inclined with respect to the equatorial plane of the tyre. Preferably, said broken line comprises three rectilinear portions.

More preferably, a first portion of such a broken line has a first inclination with respect to the equatorial plane of the tyre, a second axially outermost portion with respect to the first portion has an inclination greater than that of the first portion, and a third axially outermost portion with respect to the second portion has an inclination greater than that of the second portion. This again in order to optimise the drainage of water from the tyre.

Preferably, each of said at least two second grooves is defined by a single rectilinear portion inclined with respect to the equatorial plane of the tyre.

Preferably, each of said at least two second grooves has an axially inner end portion in a axially innermost position with respect to the axially inner end portions of each of the respective first and third grooves.

In particularly preferred embodiments of the tyre of the present invention, each of said at least two first, second and third grooves has, for at least part of the circumferential extension thereof, an increasing axial size going from the annular central portion to the first annular side portion. Such a characteristic is considered by the Applicant to be particularly of interest since it allows optimal drainage of water from the central area of the tyre itself towards the shoulder areas thereof, to then be discharged outside of the tyre.

The module T of the tread band of the tyre of the present invention extends circumferentially for an angle preferably no greater than 90°.

Such an angle is preferably no smaller than 25°.

In the preferred embodiment of the tyre of the present invention, the aforementioned angle is between 30° and 60°, more preferably between 40° and 50°.

In the preferred embodiment of the tyre of the present invention, the module T also comprises pairs of fourth, fifth and sixth grooves arranged symmetrically on axially opposite sides with respect to the equatorial plane X-X.

Preferably, the fourth grooves are axially spaced from the first grooves and have an extension in the circumferential direction substantially equal to that of said first grooves.

Preferably, the fifth grooves are circumferentially spaced from the first grooves on the circumferentially opposite side with respect to the second grooves.

Preferably, the sixth grooves are arranged in the annular side portions B of the tread band.

In the preferred embodiment of the tyre of the present invention the fifth grooves are substantially triangle shaped.

Preferably, the circumferential extension of each of the sixth grooves is shorter than half the circumferential extension of each of the fifth grooves.

BRIEF DESCRIPTION OF THE DRAWINGS

Further characteristics and advantages of the tyre of the present invention shall become clearer from the following detailed description of some preferred embodiments thereof, made with reference to the attached drawings given just as non-limiting examples. In such drawings.

DETAILED DESCRIPTION OF THE INVENTION

Figure 1:
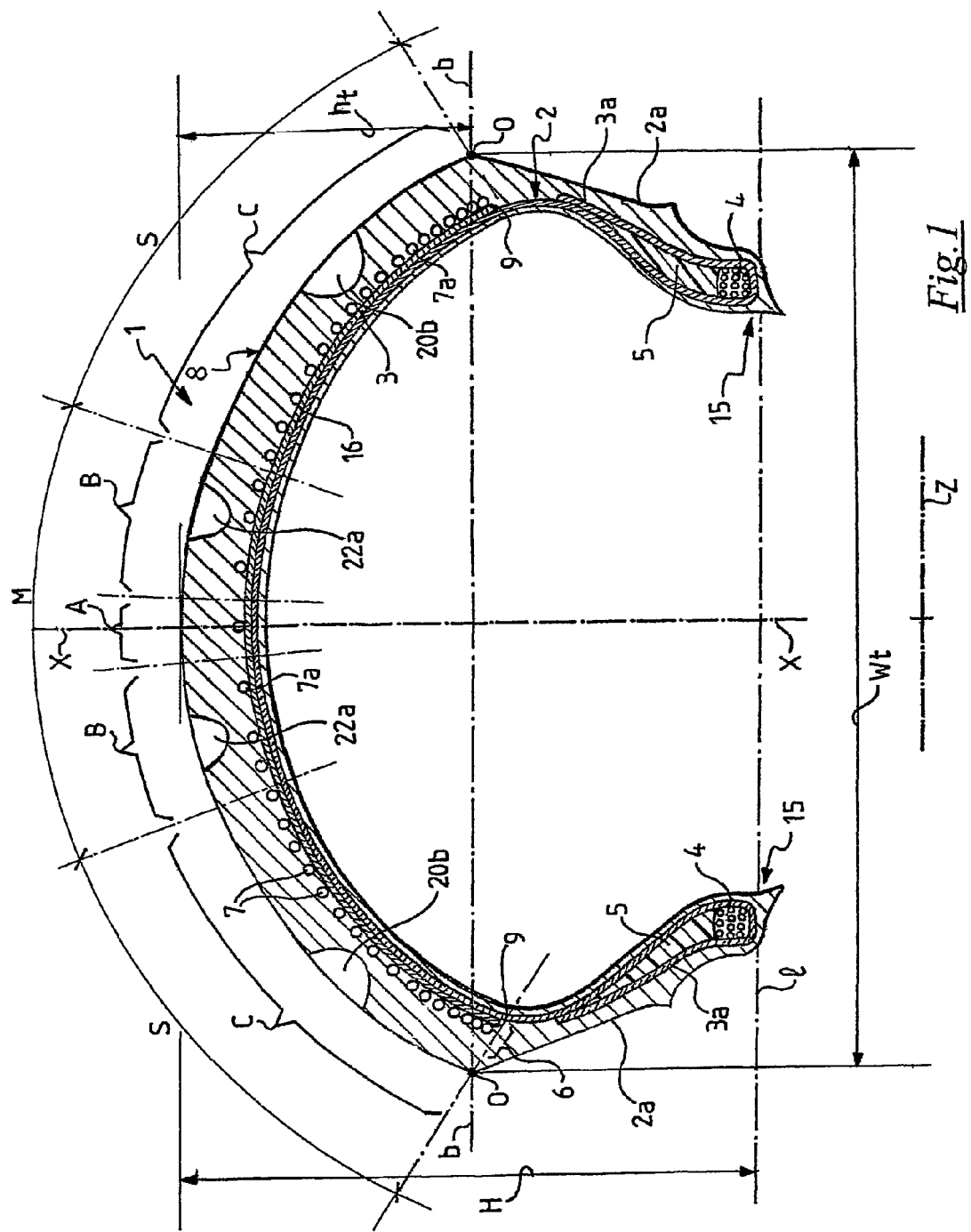
FIG. 1 shows a radial section view of a tyre according to the invention, the section being made according to the line I-I of FIG. 2.

In FIG. 1, a tyre for wheels of motor vehicles according to the present invention is wholly indicated with 1. In particular it is a tyre intended to be used on the rear wheel of a motor vehicle of the "Sport Touring" type.

In the tyre 1 an equatorial plane X-X and a rotation axis Z are defined. A circumferential direction (indicated in FIG. 2 with the arrow R orientated in the direction of rotation of the tyre) and an axial direction perpendicular to the equatorial plane X-X are also defined.

The tyre 1 comprises a carcass structure 2 having a central crown portion 16 including at least one carcass ply 3, described later on in greater detail.

The carcass structure 2 is preferably coated on the inner walls thereof with a so-called "liner", essentially consisting of a layer of airtight elastomeric material, suitable for ensuring the hermetic seal of the tyre itself once inflated.

The carcass ply 3 is engaged, at the axially opposite side edges 3a, with respective annular reinforcing structures 4 intended to hold the tyre on a corresponding mounting rim. The annular reinforcing structures 4 are typically known as "bead cores".

On the outer perimeter edge of the bead cores 4 a tapered elastomeric filler 5 is applied that occupies the space defined between the carcass plies 3 and the corresponding turned up side edge 3a of the carcass plies 3.

In an alternative embodiment, not illustrated, the carcass ply has the opposite side edges thereof associated, without turning up, with special annular reinforcing structures provided with two metallic annular inserts. In this case, a filler of elastomeric material can be arranged in an axially outer position with respect to the first annular insert. The second annular insert, on the other hand, is arranged in an axially outer position with respect to the end of the carcass ply. Finally, in an axially outer position with respect to said second annular insert, and not necessarily in contact with it, a further filler which terminates the manufacturing of the annular reinforcing structure can be provided.

As known, the area of the tyre comprising the bead core 4 and the filler 5 forms the so-called "bead", globally indicated in FIG. 1 with 15, intended to fix the tyre on a corresponding mounting rim, not shown.

In a radially outer position with respect to the aforementioned carcass structure a belt structure 6 is provided, also described in greater detail later on.

In a radially outer position with respect to the belt structure a tread band 8 is provided, through which the tyre 1 makes contact with the ground.

The tyre can also comprise a pair of sidewalls 2a applied to the side of the carcass structure 2 on axially opposite sides of the equatorial plane X-X. The sidewalls extend from the tread band 8 to the bead 15 of the tyre.

The tyre 1 of the present invention is characterised by a high transversal curvature and lowered sidewalls.

As known, the transversal curvature of a tyre is defined by the particular value of the ratio between the distance ht (FIG. 1) of the top of the tread band from the line b-b passing through the ends O of the tread, measured on the equatorial plane X-X, and the distance wt between said ends of the tread band. Should the ends of the tread band not be easily identifiable, for example due to the lack of a precise reference like for example the edge indicated in FIG. 1 with O, the distance wt can certainly be assumed to be the measurement of the maximum chord of the tyre.

The value of the aforementioned transversal curvature is called "curvature ratio" or, usually, "tread camber".

The tyre 1 of the present invention preferably has a curvature ratio greater than or equal to 0.2, preferably greater than or equal to 0.28, for example 0.30. Such a curvature ratio is in any case smaller than or equal to 0.8, preferably smaller than or equal to 0.5.

As regards the sidewalls, on the other hand, the tyre of the present invention is preferably a tyre with particularly low sidewalls (FIG. 1). By tyres with low sidewalls in the present description we mean tyres wherein the ratio between the height H, measured on the equatorial plane X-X between the top of the tread band and the fitting diameter, defined by the reference line 1 passing through the beads of the tyre, and the distance ht is smaller than 0.7, more preferably smaller than 0.5, for example equal to 0.38.

The carcass ply 3 is preferably made from elastomeric material and comprises a plurality of reinforcing elements (not shown) arranged parallel to one another and perpendicular to the equatorial plane.

The reinforcing elements included in the carcass plies 3 preferably comprise textile cords selected from those usually adopted in the manufacture of carcasses for tyres, for example nylon, rayon, PET, PEN, with an elementary wire having a diameter of between 0.35 mm and 1.5 mm:

The belt structure 6 preferably comprises rubberized cords 7, arranged substantially parallel and side-by-side in the axial direction on the crown portion 16 of the carcass structure 2, to form a plurality of coils 7a. Such coils are substantially orientated according to the rolling direction of the tyre (typically with an angle of between and 0° and 5°), such a direction usually being known as "at zero degrees" with reference to how it lies with respect to the equatorial plane X-X of the tyre. The aforementioned coils preferably extend over the entire crown portion 16 of the carcass structure 2.

Preferably, the belt structure 6 comprises windings of a single cord 7, or of a tape of rubberized fabric comprising cords arranged side-by-side, preferably up to five, wound in a spiral from one end to the other on the crown portion 16 of the carcass structure 2.

Preferably, such cords 7 are made through steel wires with high carbon content (HT), in other words steel wires with a carbon content greater than 0.9%.

Alternatively, the belt structure 6 can comprise at least two radially overlying layers, each consisting of elastomeric material reinforced with cords arranged parallel to one another. The layers are arranged so that the cords of the first belt layer are orientated obliquely with respect to the equatorial plane of the tyre, whereas the cords of the second layer also have an oblique orientation, but symmetrically crossed with respect to the cords of the first layer, to form the so-called "cross-belt".

In this case, generally, the cords 7 of the belt structure 6 are generally textile cords, for example textile cords made from synthetic fibre, for example nylon, rayon, PEN, PET, preferably synthetic fibre with high modulus, in particular synthetic aramid fibre (for example Kevlar® fibres). Alternatively, hybrid cords can be used comprising at least one wire with low modulus, in other words with a modulus no greater than 15000 N/mm$^2$ (for example nylon or rayon), interwoven with at least one wire with high modulus (for example Kevlar®), in other words with a modulus no smaller than 25000 N/mm$^2$.

Preferably, the belt structure 6 comprises a support layer substantially consisting of a sheet of elastomeric material arranged between the layer of cords 7 and the carcass ply 3 and on which the coils 7a are wound. The layer 9 preferably extends on a surface having an axial extension substantially corresponding to the surface on which the coils 7a extend. Alternatively, the layer 9 can extend on a surface smaller that the surface of extension of the coils 7a, for example only on opposite side portions of the belt structure 6.

In a further embodiment that has not been illustrated, an additional layer of elastomeric material is arranged between the belt structure 6 and the tread band 8. Such a layer preferably extends over a surface corresponding to the surface of extension of the belt structure 6. Alternatively, the aforementioned additional layer can extend over a surface smaller than the surface of extension of the belt structure 6, for example only on opposite side portions of the belt structure 6.

In a preferred embodiment of the tyre 1 of the present invention, at least one of the layer 9 and the aforementioned additional layer comprises short aramid fibres, for example in Kevlar®, dispersed in the elastomeric material.

The tread band 8 has a tread pattern defined by a plurality of grooves variously distributed in the different areas of the tyre.

Figure 2:
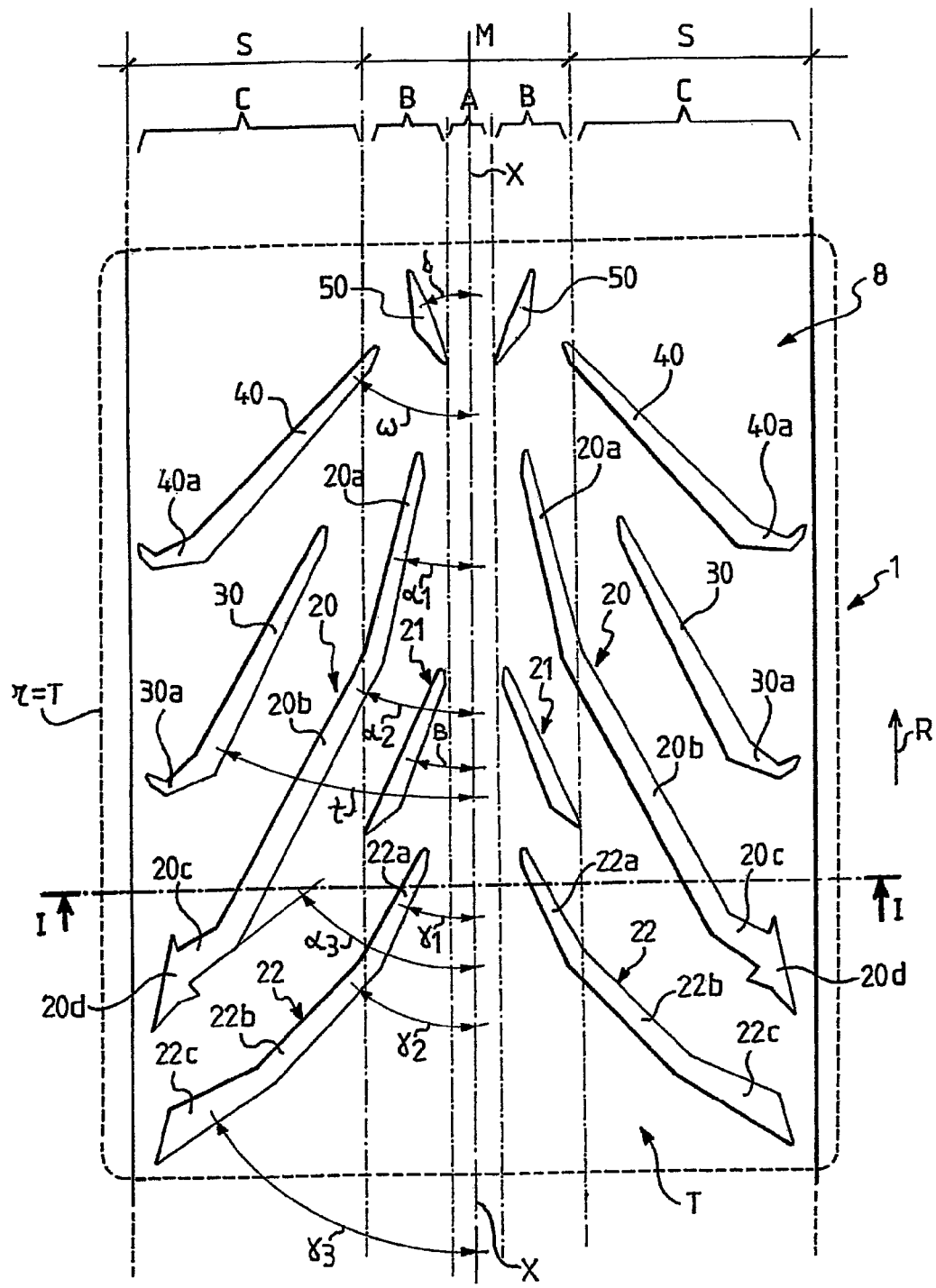
FIG. 2 shows a portion of the plan extension of a portion of the tread band of the tyre of FIG. 1.

As better illustrated in FIG. 2, in the tread band 8 it is possible to identify an annular central portion A arranged astride of the equatorial plane X-X, two axially outer annular side portions C, arranged on axially opposite sides with respect to the annular central portion A and two annular side portions B also arranged on axially opposite sides with respect to the annular central portion A, each of which in turn being arranged between the annular central portion A and a respective annular side portion C.

The annular central portion A and the annular side portions B are defined in a central area M of the tread band 8 intended to come into contact with the road surface when the motor vehicle travels in a straight line or slightly leaning, whereas the side portions C are mainly defined in shoulder areas S of the tread band 8, i.e. in those areas intended to come into contact with the road surface when the motor vehicle turns a bend leaning to a greater extent.

The annular central portion A extends astride of the equatorial plane X-X for an axial extension shorter than or equal to 20% of the axial extension of the tread band 8, for example equal to about 10%.

Each annular portion B has an axial extension shorter than or equal to 20% of the axial extension of the tread band 8, for example equal to about 15%.

Each annular portion C has an axial extension shorter than or equal to 40% of the axial extension of the tread band 8, for example equal to about 35%.

With reference to FIG. 2, the central area M extends astride of the equatorial plane X-X for an axial extension shorter than or equal to 60% of the axial extension of the tread band 8, for example equal to about 40%. Of course, the shoulder areas S can have a different axial extension to that illustrated in FIG. 2; for example, keeping a division into annular portions A, B and C like the one shown in FIG. 2, the shoulder areas S can have an axial extension longer or shorter than the axial extension of the annular side portions C. In other words, the axially outer portions of the annular side portions B may or may not be part of the shoulder areas S of the tread band 8.

The pattern of the tread band 8 of the tyre of the present invention is defined by a plurality of grooves variously distributed along the circumferential and axial extension of the tread band 8.

Such grooves define a pattern that is replicated with a predetermined pitch along the circumferential direction of the tyre 1. FIG. 2 shows the tread pattern of the tyre 1 of the present invention at a module T.

In the tread band 8 the module T comprises distinct pairs of grooves 20, 21 and 22, arranged symmetrically inclined on axially opposite sides with respect to the equatorial plane X-X. Such a module T is replicated with a predetermined pitch along a circumferential direction of the tyre 1. It is defined in FIG. 2 by a dashed line indicated with r.

The module T of the tread band 8 extends circumferentially for an angle preferably no greater than 90° and no smaller than 25°. Such an angle can for example be equal to about Structural details on the grooves 20, 21 and 22 shall be provided later on in the present description.

The module T of the tread band 8 also comprises pairs of grooves 30, 40 and 50 also arranged symmetrically on axially opposite sides with respect to the equatorial plane X-X.

Structural details on the grooves 30, 40 and 50 shall be provided later on in the present description.

In an alternative embodiment, that has not been illustrated, of the tyre of the present invention, the grooves 20, 21, 22, 30, 40 and 50 are not symmetrically arranged with reference to the equatorial plane X-X, but they are staggered in the circumferential direction by a predetermined offset.

Hereafter we shall describe in detail the tread pattern of the tyre 1 of the present invention with reference to a single side of the tread band 8 with respect to the equatorial plane X-X, whereas it is understood that what is described also applies to the other side of the tread band 8.

In the module T, the grooves 20 each extend along a respective broken line that preferably has at least two differently inclined rectilinear portions, more preferably three rectilinear portions, where each portion is inclined with respect to the equatorial plane X-X by a respective predetermined angle. However, it is possible to provide for a number of portions other than three or even just one curvilinear portion.

Preferably, a first axially innermost portion 20a of the grooves 20 is inclined by an angle α1, a second axially intermediate portion 20b is inclined by an angle α2 larger than α1 and a third axially outermost portion 20c is inclined by an angle α3 larger than α2. The angle α1 is preferably between 0° and 20° and in the specific example of FIG. 2 it is equal to about 12°. The angle α2 is preferably between 15° and 35° and in the specific example of FIG. 2 it is equal to about 27°. The angle α3 is preferably between 45° and 65° and in the specific example of FIG. 2 it is equal to about 53°.

Each groove 20 extends overall on the tread band 8 starting from an inner area of the respective annular side portion B up to an axially outer portion of the respective annular side portion C. For example, the overall circumferential extension of the grooves 20 is equal to about 80% of the module T.

Preferably, as shown in FIG. 2, the portions 20a extend over the respective annular side portions B, whereas the portions 20b and 20c extend over the respective annular side portions C.

For example, the circumferential extension of the portion 20a is no greater than 40% of the overall circumferential extension of the grooves 20, the circumferential extension of the portion 20b is no greater than 55% of the overall circumferential extension of the grooves 20 and the circumferential extension of the portion 20c is no greater than 20% of the overall circumferential extension of the grooves 20.

Preferably, the portion 20c is, at a free end portion 20d thereof, substantially triangle shaped.

The third grooves 22 are circumferentially spaced from the grooves 20.

The grooves 22 also extend each along a respective broken line that preferably has at least two differently inclined rectilinear portions, more preferably three rectilinear portions, where each portion is inclined with respect to the equatorial plane X-X by a respective predetermined angle. Also in this case it is possible to provide for a number of portions other than three or even a curvilinear one.

Preferably, a first axially innermost portion 22a of the grooves 22 is inclined by an angle γ1, a second axially intermediate portion 22b of the grooves 22 is inclined by an angle γ2 that is greater than γ1 and a third axially outermost portion 22c of the grooves 22 is inclined by an angle γ3 that is greater than γ2.

The angle γ1 is preferably between 15° and 35° and in the specific example of FIG. 2 it is equal to about 25°. The angle γ2 is preferably between 35° and 55° and in the specific example of FIG. 2 it is equal to about 43°. The angle γ3 is preferably between 45° and 65° and in the specific example of FIG. 2 it is equal to about 57°.

Each groove 22 extends overall on the tread band 8 starting from an inner area of the respective annular side portion B up to an axially outer portion of the respective annular side portion C. Preferably, the overall circumferential extension of the grooves 22 is shorter than that of the grooves 20, for example equal to about 45% of the module T.

Preferably, as shown in FIG. 2, the portion 22a extends over the annular side portion B, whereas the portions 22b and 22c extend over the annular side portion C.

For example, the circumferential extension of the portion 22a is no greater than 45% of the overall circumferential extension of the groove 22, the circumferential extension of the portion 22b is no greater than 50% of the overall circumferential extension of the groove 22 and the circumferential extension of the portion 22c is no greater than 35% of the overall circumferential extension of the groove 22. The grooves 22 thus only minimally extend over the respective annular side portions B, instead extending mostly on the annular side portions C.

For example, the grooves 22 extend on the annular side portions B for a portion having an axial length no greater than 30% of the overall axial length of the groove 22.

The second grooves 21 are circumferentially spaced from the grooves 20 and 22 and arranged between them. They are defined by a single rectilinear portion preferably inclined with respect to the equatorial plane X-X by an angle β having a size of between α1 and α2. The angle β is preferably between 10° and 30°. In the specific example shown in FIG. 2 such an angle is equal to about 20°.

However, it is possible to provide for grooves 21 formed from two or more rectilinear portions to form a broken line, or else a curvilinear portion.

Each groove 21 extends circumferentially on the tread band 8 only at the respective annular side portion B and up to an axially outer portion of such an annular side portion B, without therefore extending on the respective annular side portion C. Preferably, the overall circumferential extension of the grooves 21 is shorter than one third of the circumferential extension of the grooves 20. In the example of FIG. 2, the grooves 21 have a circumferential extension equal to about 25% of the module T.

Each of the grooves 21 preferably has an axially inner end portion arranged in an axially innermost position with respect to the axially inner end portions of the grooves 20 and 22.

Let us now go back to the grooves 30, 40 and 50 of the tread pattern of the tyre 1 of the present invention.

The grooves 30 are axially spaced from the grooves 20 and have a circumferential extension substantially equal to half that of the grooves 20.

The grooves 30 extend over the annular side portions C of the tread band 8 and are inclined with respect to the equatorial plane X-X by an angle τ whose size is preferably between 15° and 35° (in the specific example illustrated in FIG. 2 it is equal to about 25°) and they have a turned up free end portion 30a defined at the axially outermost portion of the annular side portion C.

The grooves 40 are circumferentially spaced from the grooves 20 on a circumferentially opposite side with respect to the grooves 21. They are substantially the same shape and size as the grooves 30 and they are inclined with respect to the equatorial plane X-X by an angle Ω the size of which is preferably between 30° and 50° (in the specific example illustrated in FIG. 2 it is equal to about 41°).

The grooves 40 substantially extend over the annular side portions C of the tread band 8, possibly also extending over the annular side portions B only for a portion of small size. They have a rutned-up free end portion 40a defined at the axially outermost portion of the annular side portion C.

The sixth grooves 50, on the other hand, extend only over the annular side portions B of the tread band 8. They are circumferentially spaced from the grooves 40 on the opposite side to the grooves 30 and are substantially triangle shaped, with the base of the triangle facing towards the equatorial plane and inclined by an angle δ that in the example of FIG. 2 is taken in an opposite direction to that of all the other grooves described above and is equal to about 23°.

The circumferential extension of the grooves 50 is shorter than half of the grooves 30 and 40.

All of the grooves described above, with the exception of the grooves 50, the triangle-shaped free end portion of the grooves 20 and the turned up free end portions of the grooves 30 and 40, have an increasing axial size going from the annular central portion A towards the annular side portion C. Such a characteristics, in combination with the inclination of the grooves allows effective draining of water in wet road conditions, such drainage being made more effective by the fact that the grooves 20, 22, 30 and 40 extend over the opposite shoulder areas S of the tyre 1.

Moreover, all of the grooves described above have substantially the same depth, which decreases moving from the annular central portion A towards the annular side portion C.

None of the grooves described above extends over the annular central portion A of the tread band 8. Such a portion thus preferably has no grooves of the type described above. Possibly, grooves of much shallower depth than that of the grooves described above may be provided in such an annular central portion A.

The tread pattern described above implies for the tyre 1 of the present invention a solid/empty ratio that, at the central area M thereof intended to come into contact with the road surface when travelling in a straight line or slightly leaning, is greater than that at the opposite shoulder areas S thereof intended to come into contact with the road surface on a bend. In this way the desired structural mobility is obtained in the central area M of the tyre to achieve the desired performance in terms of traction and acceleration and of comfort when the motor vehicle travels in a straight line or slightly leaning, and the desired structural stiffness is obtained in the shoulder areas S of the tyre 1 to achieve the desired performance in terms of lateral stability, grip and controllability when the motor vehicle turns bends leaning to a greater extent.

Of course, a man skilled in the art can bring further modifications and variants to the invention described above in order to satisfy specific and contingent application requirements, these variants and modifications in any case being covered by the scope of protection as defined by the following claims.

The invention claimed is:

1. A tyre for motor vehicles, having a tread band and comprising an annular central portion astride an equatorial plane of the tyre, two first annular side portions arranged on axially opposite sides with respect to the annular central portion and two second annular side portions each arranged between the annular central portion and a respective first annular side portion, the tread band having at least one module replicated along a circumferential direction of the tyre and comprising:

at least two first grooves inclined with respect to the equatorial plane and each extending on a respective second annular side portion up to reaching a respective first annular side portion;

at least two second grooves inclined with respect to the equatorial plane and spaced from said at least two first grooves in the circumferential direction, each of said at least two second grooves extending only on a respective second annular side portion and up to an axially outer portion of said second annular side portion; and at least two third grooves inclined with respect to the equatorial plane and arranged, along the circumferential direction, on the opposite side of said at least two first grooves with respect to said at least two second grooves, each of said at least two third grooves extending on a respective second annular side portion and on a respective first annular side portion, an extension on the second annular side portion being shorter than an extension on the first annular side portion.

2. The tyre according to claim 1, wherein said at least two first grooves, said at least two second grooves and said at least two third grooves, respectively, extend symmetrically from axially opposite sides with respect to the equatorial plane of the tyre.

3. The tyre according to claim 1, wherein each of said at least two second grooves extends substantially on an entire respective second annular side portion.

4. The tyre according to claim 1, wherein each of said at least two third grooves extends on a respective second annular side portion for a portion having an axial length no greater than 20% of an overall axial length of said groove.

5. The tyre according to claim 1, wherein each of said at least two first grooves extends from a respective second annular side portion to an axially outer portion of a respective first annular side portion.

6. The tyre according to claim 1, wherein each of said two third grooves extends from a respective second annular side portion to an axially outer portion of a respective first annular side portion.

7. The tyre according to claim 1, wherein said at least two second grooves have an extension in the circumferential direction shorter than an extension of said at least two first grooves and of said at least two third grooves.

8. The tyre according to claim 1, wherein said at least two third grooves have an extension in the circumferential direction shorter than an extension of said at least two first grooves.

9. The tyre according to claim 7, wherein the extension in the circumferential direction of each of said at least two second grooves is shorter than half the extension in the circumferential direction of each of said at least two third grooves.

10. The tyre according to claim 1, wherein each of said at least two first grooves extends along a broken line comprising at least two rectilinear portions that are differently inclined with respect to the equatorial plane of the tyre.

11. The tyre according to claim 10, wherein said broken line comprises three rectilinear portions.

12. The tyre according to claim 11, wherein a first rectilinear portion has a first inclination with respect to the equatorial plane of the tyre, a second axially outermost rectilinear portion with respect to the first rectilinear portion has an inclination greater than an inclination of the first rectilinear portion, and a third rectilinear portion which is an axially outermost rectilinear portion with respect to the second rectilinear portion has an inclination greater than an inclination of the second rectilinear portion.

13. The tyre according to claim 12, wherein the axially outermost rectilinear portion of said broken line is, at a free end portion thereof, substantially triangle-shaped.

14. The tyre according to claim 1, wherein each of said at least two third grooves extends along a broken line comprising at least two rectilinear portions that are differently inclined with respect to the equatorial plane of the tyre.

15. The tyre according to claim 14, wherein said broken line comprises three rectilinear portions.

16. The tyre according to claim 15, wherein a first rectilinear portion has a first inclination with respect to the equatorial plane of the tyre, a second axially outermost rectilinear portion with respect to the first rectilinear portion has an inclination greater than an inclination of the first rectilinear portion, and a third axially outermost rectilinear portion with respect to the second rectilinear portion has an inclination greater than an inclination of the second rectilinear portion.

17. The tyre according to claim 1, wherein each of said at least two second grooves is defined by a single rectilinear portion inclined with respect to the equatorial plane.

18. The tyre according to claim 1, wherein each of said at least two second grooves has an axially inner end portion in an axially innermost position with respect to axially inner end portions of each of the respective first and third grooves.

19. The tyre according to claim 1, wherein each of said at least two first, second and third grooves has, for at least part of a circumferential extension thereof, an increasing axial size from the annular central portion to a respective first annular side portion.

20. The tyre according to any claim 1, wherein said at least one module extends circumferentially for an angle no greater than 90°.

21. The tyre according to claim 1, wherein said at least one module extends circumferentially for an angle no less than 25°.

* * * * *